(12) United States Patent
Greene

(10) Patent No.: US 8,763,386 B2
(45) Date of Patent: Jul. 1, 2014

(54) LARGE WATER TURBINE

(76) Inventor: Geoffrey Byron Greene, Memphis, TN (US)

( * ) Notice: Subject to any disclaimer, the term of this patent is extended or adjusted under 35 U.S.C. 154(b) by 958 days.

(21) Appl. No.: 12/806,154

(22) Filed: Aug. 6, 2010

(65) Prior Publication Data

US 2012/0031093 A1     Feb. 9, 2012

(51) Int. Cl.
*F03B 13/10*     (2006.01)

(52) U.S. Cl.
USPC ................................ 60/398; 290/54; 415/906

(58) Field of Classification Search
USPC ......... 60/398, 639, 496; 290/43, 54; 417/336, 417/334; 415/3.1, 7, 92, 905, 906, 916; 416/84
See application file for complete search history.

(56) References Cited

U.S. PATENT DOCUMENTS 4,201,059 A * 5/1980 Feder ............................... 60/639
4,698,516 A * 10/1987 Thompson ...................... 290/54

* cited by examiner

*Primary Examiner* — Edward Look
*Assistant Examiner* — Logan Kraft

(57) ABSTRACT

This invention captures hydrokinetic energy to do work such as produce electricity. The hydrokinetic flow exerts a torque on a turbine wheel. The wheel causes a set of tanks to rotate around a horizontal centerline. Working fluid drains from tanks near the top of the wheel to drive a conventional turbine before draining into lower tanks. Although a mechanical power transmission driven by the turbine wheel is simpler in concept, scale up to large slowly rotating wheels encounters increasingly difficult design problems: transmission of 1 kW at 1 rpm requires 6,959 ft-lb. In contrast, the conventional turbine of the fluid drive system provides mechanical power for use at a much higher speed than the turbine wheel. Therefore, very large engines can be built without a step-up transmission or components that must withstand extremely large torque loads. One unit can produce reliable 24/7 utility-scale base-load electrical power.

1 Claim, 5 Drawing Sheets one of multiple fluid tanks 46

LARGE WATER TURBINE

CROSS-REFERENCE TO RELATED APPLICATION

This application is entitled to the benefit of Provisional Patent Application Ser. #612173744-080809 filed 2009.

BACKGROUND-FIELD OF INVENTION

This invention captures hydrokinetic energy to do work such as produce electricity.

SEQUENCE LISTING

Not applicable.

BACKGROUND-DESCRIPTION OF PRIOR ART

For centuries, machines have extracted energy from water falling in a gravitational field to do work such as grinding wheat or producing electricity. In contrast, relatively few machines have captured the kinetic energy in a flowing fluid (e.g., river, ocean current) to do work. Comparing two hydrokinetic energy capture devices that differ in diameter by a factor of 10 but are otherwise similar, the large device has the potential of producing the same amount of power as 100 of the smaller devices. Therefore it is very desirable to use large devices if a large amount of power is desired.

Prior art for hydrokinetic systems has primarily used mechanical components to transmit the energy from the capture device (turbine) to the output shaft. Although mechanical transmission of power using a shaft concentric with the turbine is well suited to relatively small systems (e.g., sub-megawatt), as system size increases this mode of power transmission becomes more and more difficult. As the size of the capture device increases, efficient capture of the hydrokinetic energy requires a reduction in the rotational speed of the device deployed in a naturally occurring flow. With increasing size, the influences of increasing power levels and decreasing rotational speeds both contribute to the amount of torque the mechanical components must transmit without failing. For example, if the size doubles, the power that can be captured increases by a factor of four. If the larger system's rotational speed is half that of the smaller system, the torque to be transmitted in the larger system is eight times greater than in the smaller system. To give a sense of the challenge presented by decreasing rotational speeds, transmission of 1 kW of energy at 1 rpm requires a torque of 6,959 ft-lb. The problem is further exacerbated in that decreasing the rotational speed of the capture device requires increasing the speed-ratio of the step-up transmission required to produce rotational speeds suitable for driving an electric generator. Designs that attempt to avoid this challenge by attaching the mechanical drive system to a turbine rim encounter the difficulties of high precision machining of very large components, and are themselves fraught with maintenance issues and other challenges.

Therefore, as hydrokinetic power generation system size increases, prior art that relies on the mechanical transmission of power from the capture device to the output shaft encounters increasingly difficult design challenges. Increasingly large and complex mechanical sub-systems introduce losses, require maintenance, reduce system reliability, and may jeopardize the economic viability of the system.

SUMMARY

This invention may be called an engine because it harnesses the kinetic energy in a flow to do work. A fluid drive allows large amounts of power to be delivered to the engine output at a much higher rotational speed than that of the hydrokinetic capture device. For example, an electric generator can be driven at conventional rotational speeds even when this engine is scaled to a very large size to produce a large amount of electricity.

OBJECTS AND ADVANTAGES

Accordingly, besides the objects and advantages of the hydrokinetic turbine engine described in my above patent, several objects and advantages of the present invention are:
 (a) to generate megawatts of power from a single hydrokinetic turbine engine;
 (b) to generate megawatts of power without a speed-ratio step-up mechanical power transmission subsystem;
 (c) to generate megawatts of power using few moving components,
 (d) to generate megawatts of power using components that are commercially available or can be simply manufactured,
 (e) to generate megawatts of power with a system that is robust and will function for decades between overhauls,
 (f) to generate megawatts of power from a sustainable energy source that is continuously and reliably available;
 Further objects and advantages of the present invention will become apparent from a consideration of the drawings and ensuing description.

DRAWING FIGURES

One embodiment of my invention is illustrated in FIGS. 1-5.

DESCRIPTION OF THE INVENTION

One embodiment of my invention is illustrated in FIGS. 1-5.

Figure 5:
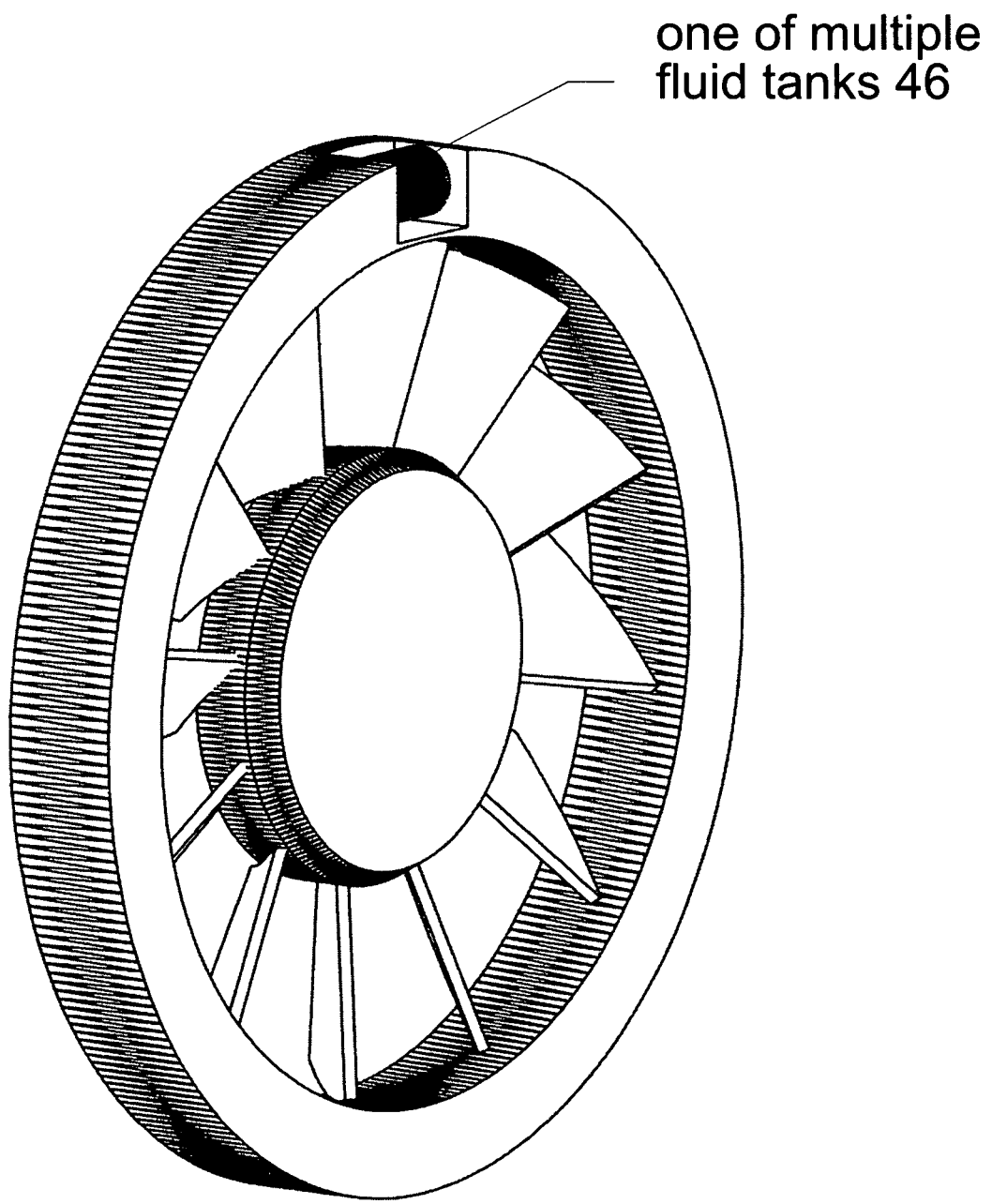
FIG. 5 is a perspective view of the hydrokinetic turbine engine with a partial cut-away view to show one of the multiple fluid tanks.

FIG. 5 is a perspective view of the hydrokinetic turbine engine with a partial cut-away view to show one of the multiple fluid tanks 46.

Figure 1:
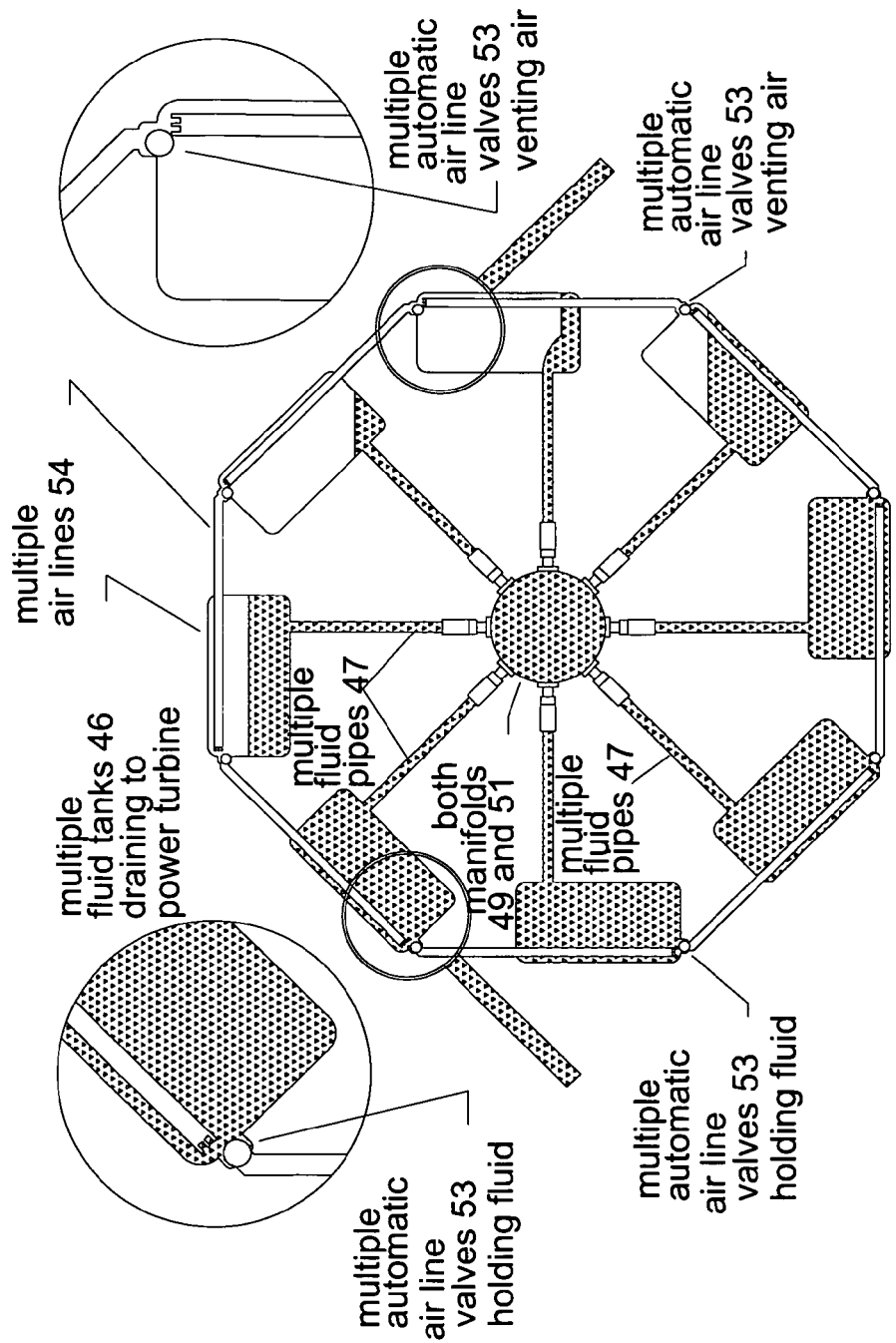
FIG. 1 depicts the arrangement of the major elements of the internal fluid drive system as if the turbine wheel rim, blades, and hub were removed to reveal the interior workings of the hydrokinetic turbine engine.

FIG. 1 depicts the arrangement of the major elements of the internal fluid drive system as if the turbine wheel rim, blades, and hub were removed to reveal the interior workings of the hydrokinetic turbine engine. The tanks 46, air valves 53, and air lines 54 are located within the wheel rim. The fluid pipes 47 are located mostly within the blades. The single equalizer valve 52, and the manifolds 49 and 51 are located within the turbine wheel hub.

Figure 2:
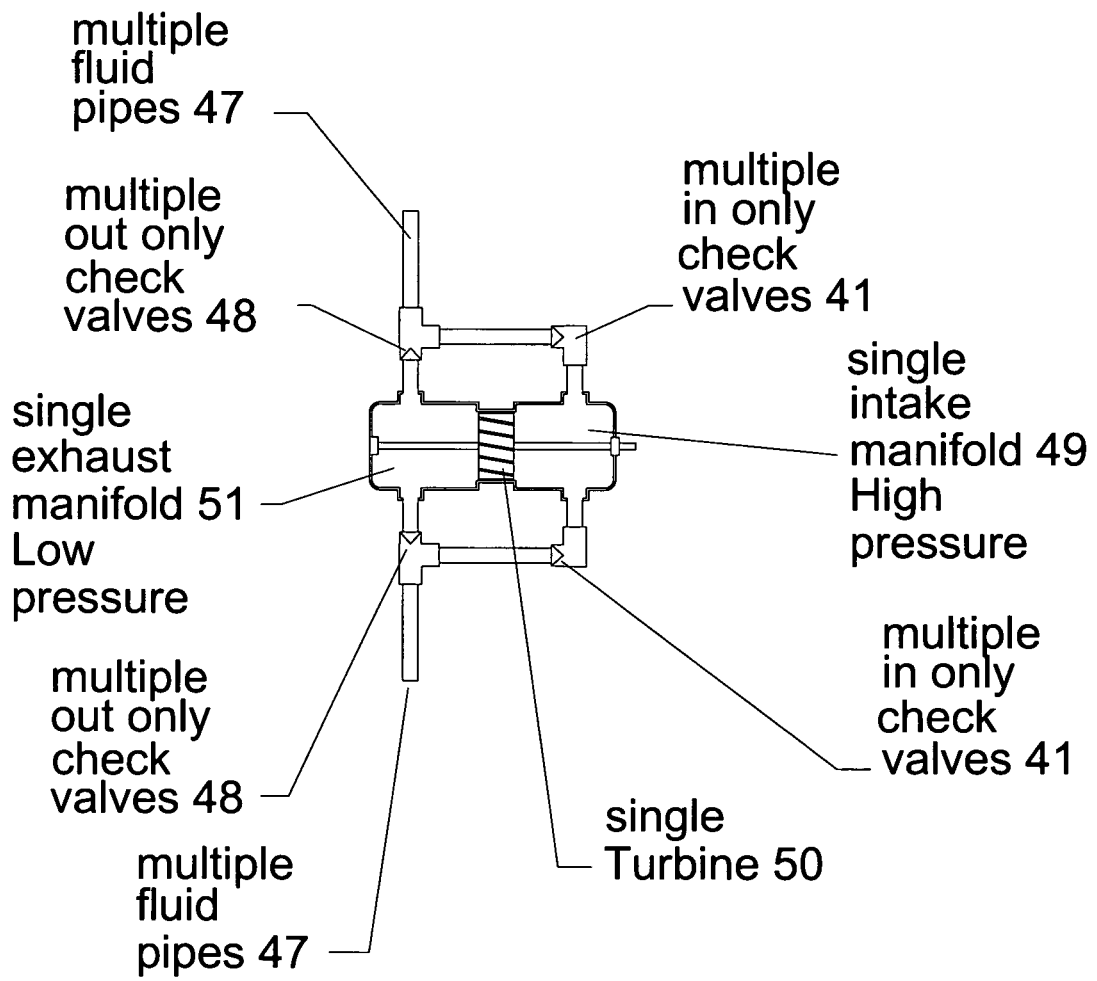
FIG. 2 is a side-view detail of the internal turbine and associated piping system.

FIG. 2 is a detailed view of the internal turbine 50 and associated piping system located within the turbine wheel hub. Fluid pipes 47 that begin in the wheel rim and pass through the blades, penetrate the hub boundary and terminate in the manifold sub-system. Within the manifold sub-system is an intake manifold 49 through which fluid will enter the turbine 50, and an exhaust manifold 51 into which fluid will flow from the turbine 50. A network of pipes and check valves (41 and 48) connects the manifold sub-system to the fluid pipes 47.

Figure 3:
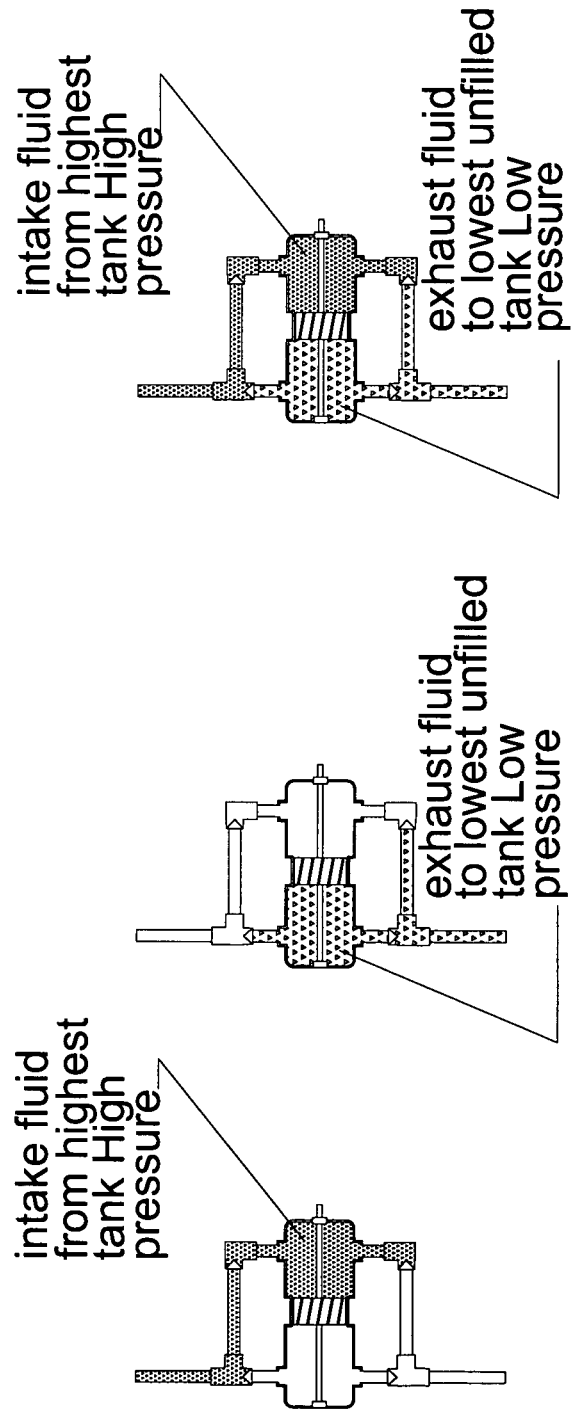
FIG. 3 is a side-view detail of the internal turbine and associated piping system showing the flow path into the turbine, the flow path out of the turbine, and a depiction of both paths together.

FIG. 3 presents the same physical elements as FIG. 2 and is intended to support understanding of the operation of my invention.

Figure 4:
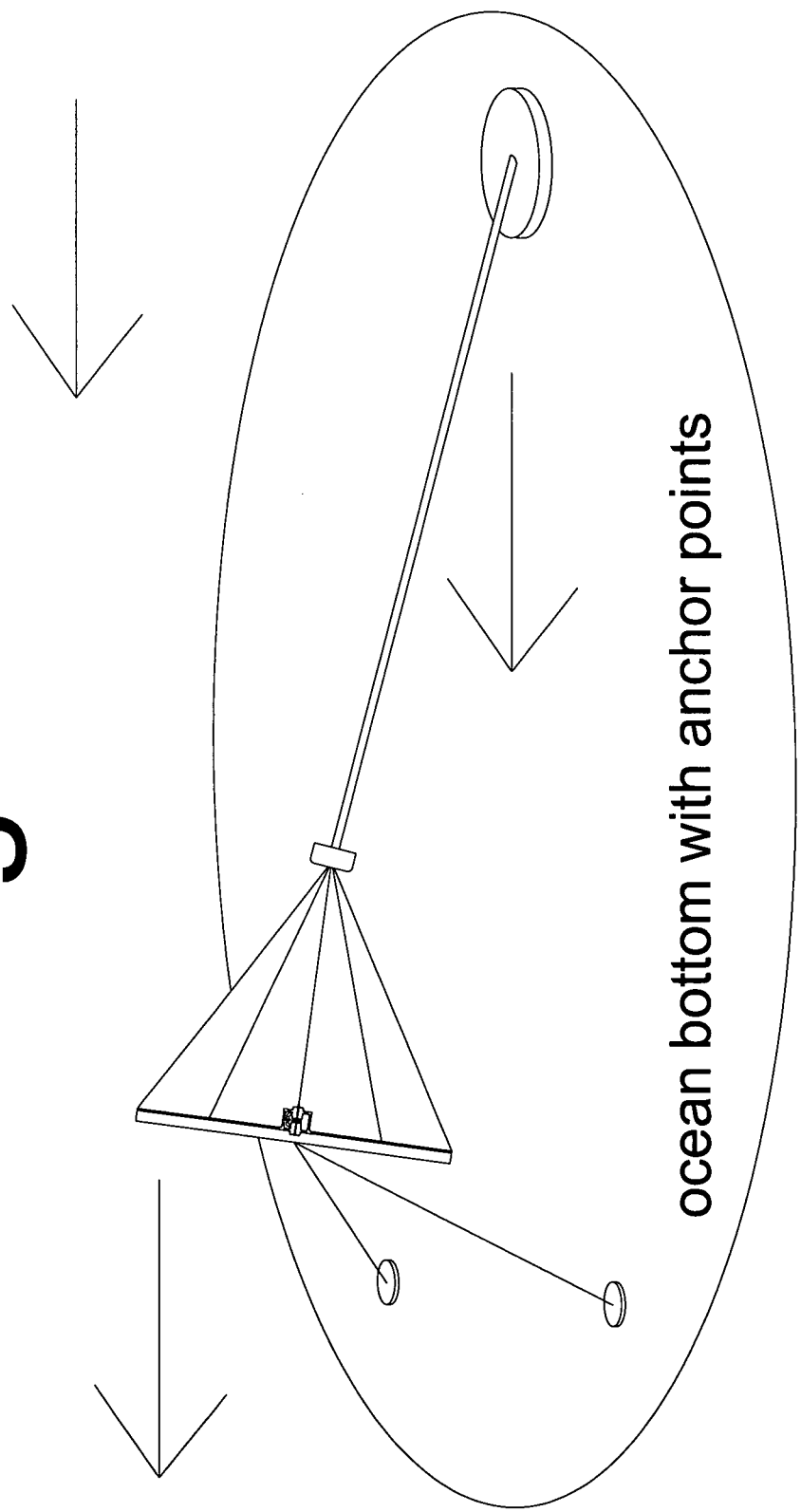
FIG. 4 shows a mooring plan for the invention.

FIG. 4 shows a mooring plan for the hydrokinetic turbine engine. The arrows indicate the dominant direction of the hydrokinetic flow. In this view, the turbine wheel is held by the upstream mooring lines as if it were a parachute. These mooring lines are collected into a bearing that in turn is attached to an upstream anchor. Mooring lines also extend to an anchor on either side of the turbine wheel centerline.

OPERATION OF THE INVENTION

The turbine wheel of the illustrated embodiment depicted in FIG. 5 is positioned within a hydrokinetic flow (e.g., river, ocean current) as depicted in FIG. 4. Flow through the wheel exerts a torque that causes the wheel to rotate.

The internal flow system depicted in FIG. 1 is rigidly attached to the turbine wheel of FIG. 5. The fluid tanks 46 are distributed about the circumference of the turbine wheel. The position around the circumference can be concisely expressed by analogy to a clock. As the wheel rotates, the tanks move in a clock-wise rotation. Tanks 46 between 12 o'clock and 3 o'clock are mostly empty. As one of the tanks 46 approaches 12 o'clock, the fluid within it is at the highest elevation in the internal fluid drive system. Fluid from a high tank will drain through its fluid pipe 47, through the intake manifold 49, flow through the turbine 50, through the exhaust manifold 51, through a fluid pipe 47, and into a lower tank 46 that is not full. As the system rotates, falling fluid drives the turbine 50, that in turn provides mechanical power for use. As the system rotates, fluids within the system move through the system but are not depleted.

The in-only check valves 41 allow flow from an upper tank to enter the intake manifold 49, and prevent flow from leaving the intake manifold through any of the fluid pipes 47. The out-only check valves 48 allow flow to drain into a tank from the exhaust manifold 51, and prevent flow from entering the exhaust manifold through any of the fluid pipes 47. Working in concert, the check valves 41 and 48 ensure that all fluid falling through system must pass through the turbine 50.

The automatic air line valves 53 and the air lines 54 allow gas to pass from a tank that is filling to a tank that is draining.

CONCLUSIONS, RAMIFICATIONS, AND SCOPE

Thus the reader will see that my invention captures hydrokinetic energy to do work such as produce electricity, and it can be scaled to a size at which a single unit can produce a large amount of power and therefore a large amount of electricity.

While my above description contains many specificities, these should not be construed as limitations on the scope of the invention, but rather as an exemplification of one illustrated embodiment thereof. Many other variations are possible. For example, with appropriate relocation of the invention's elements its function will remain unchanged if a different orientation of the turbine wheel blades induces a counter-clockwise rotation of the turbine wheel. The detailed shape of the inventions elements may be changed (e.g., ellipsoidal instead of cylindrical tanks) without changing the basic function of the invention. The multiple in only check valves 41 and the multiple out only check valves 48 may be of identical or different design. The intake manifold 49 and exhaust manifold 51 may be of identical or different designs.

Although the illustrated embodiment shows components identified as "multiple" as being of identical shape and size, they may differ from each other in their details such as shape, size, and material of construction provided these differences do not change their functionality. Elements of the invention identified as parts of the "internal fluid drive system" (e.g., tanks, pipes, turbine) may be located inside or outside of the turbine wheel without changing the invention's function. Wherever a particular number of elements appears in the invention description (e.g., eight tanks in FIG. 1, one turbine in FIG. 2), this number is not unique. For example, a turbine wheel could function with only a single blade. Although the illustrated embodiment of the turbine wheel shows an outer rim, a hub, and strengthening rings, these are not essential to the invention's function.

Although working fluid flows through the same conduit 47 to fill and drain a tank in the illustrated embodiment, alternate embodiments may use one conduit to fill a tank and another to drain the same tank.

The working fluid that drives the turbine 50 may be water or another fluid. Although the illustrated embodiment identifies air as filling the portion of the tanks 46 not filled with working fluid, any fluid less dense than the working fluid can be used (e.g., nitrogen). Although the illustrated embodiment shows transfer of this less dense fluid between tanks 46 via air lines 54 and automatic air line valves 53, alternate embodiments may not require tank-to-tank transfer of such a fluid. For example, each tank may function like an accumulator in which the filling and emptying of working fluid is accommodated by the motion of mechanical boundary (e.g., bladder, piston) without the transfer of another fluid into or out of the accumulator.

Accordingly, the scope of the invention should be determined not by the embodiment illustrated, but by the appended claims and their legal equivalents.

I claim:

1. A hydrokinetic turbine engine comprising:
   (a) a primary turbine driven to rotate by a hydrokinetic flow,
   (b) a secondary turbine, driven by the working fluid flowing through a closed-circuit, that provides mechanical power as the output of the engine,
   (c) said closed-circuit working fluid flow system comprised of two or more tanks attached to said primary turbine so as to rise and fall with rotation of said primary turbine, and a flow network connecting said tanks through which working fluid drains from an upper tank through one or more conduits into an intake manifold with a flow control capability that only accepts fluid from said tanks and directs the flow into said secondary turbine from which the working fluid exits into an exhaust manifold with a flow control capability that directs working fluid through one or more conduits toward the tanks but will not accept fluid flow from the tanks.

* * * * *